(12) United States Patent
Geissler et al.

(10) Patent No.: US 7,080,433 B2
(45) Date of Patent: Jul. 25, 2006

(54) WORKPIECE SEAT FOR BAR-SHAPED WORKPIECES

(75) Inventors: Alfred Geissler, Pfronten (DE); Karl Lechleiter, Oy-Mittelberg (DE)

(73) Assignee: Deckel Maho Pfronten GmbH (DE)

( * ) Notice: Subject to any disclaimer, the term of this patent is extended or adjusted under 35 U.S.C. 154(b) by 124 days.

(21) Appl. No.: 10/785,121

(22) Filed: Feb. 23, 2004

(65) Prior Publication Data

US 2004/0194269 A1    Oct. 7, 2004

(30) Foreign Application Priority Data

Feb. 26, 2003    (DE)    ........................... 203 03 147 U

(51) Int. Cl.
*B25B 27/14*    (2006.01)
(52) U.S. Cl. .................. 29/276; 409/231; 82/126; 82/127; 82/142; 82/147
(58) Field of Classification Search ................. 29/276; 409/231, 239, 241; 82/126–127, 142, 147
See application file for complete search history.

(56) References Cited

U.S. PATENT DOCUMENTS 3,752,019 A * 8/1973 Kaneko ................. 82/142

6,272,956 B1 * 8/2001 Schuettel ................. 82/142
6,389,939 B1 * 5/2002 Babuder et al. ............. 82/129

FOREIGN PATENT DOCUMENTS

| DE | 3913139 C2 | 11/1989 |
| DE | 3819181 A1 | 12/1989 |
| DE | 19826518 A1 | 12/1999 |

* cited by examiner

*Primary Examiner*—Boyer D. Ashley
*Assistant Examiner*—Eric A. Gates
(74) *Attorney, Agent, or Firm*—The Maxham Firm

(57) ABSTRACT

A workpiece seat for the machining of bar-shaped workpieces by milling and turning. The workpiece seat has an elongated housing, a spindle rotatably supported in the housing, and an electric direct drive for the spindle. The drive rotor is fixed on the spindle and the drive stator is fixed in the housing. Clamping means are provided at the working end in the spindle for fixing a bar-shaped workpiece in the spindle. A connection unit is provided at the rear part of the housing for power supply. A fixing means is provided for fixing the spindle in the housing. To achieve high machining accuracy of thick bars and high clamping forces at reduced longitudinal dimensions, as well as relatively simple design, the fixing means is formed as a compact part and is arranged at the working end of the housing.

7 Claims, 3 Drawing Sheets

WORKPIECE SEAT FOR BAR-SHAPED WORKPIECES

BACKGROUND OF THE INVENTION

1. Field of the Invention

The present invention relates generally to machine tools, and more specifically to a workpiece seat for the machining of bar-shaped workpieces by milling and turning.

2. Discussion of Related Art

Various types of machine tools have been developed for the machining of workpieces in a single chucking by drilling and milling, as well as turning. This operation provides several advantages. For example, it provides higher machining accuracy, higher throughput and reduced idle times because set-up operations become unnecessary. In general, two types of such machines have been in use. In the first, the workpieces are processed for the most part by turning. In the second, the workpieces are processed preferably by milling. This latter type is akin to milling machines.

The machine tool shown in FIG. 1 belongs to the latter type. It has a relatively broad movable column 1 in bottom trough 2. Horizontal slides 3 are mounted on the upper side of the column. Slide 4 is movable in these slides. The slide has rails 5 extending transversely to slides 3. Vertical spindle stock 6 is movable in a second horizontal coordinate axis along the rails by a motor (not shown). At the front side of the spindle stock, spindle head 7 is supported in such a way that it can be rotated about an axis parallel to the second coordinate axis. Work spindle 8 is located in the spindle head. A motor (not shown) drives the work spindle. Milling, drilling, or turning tools can be alternatively clamped into the work spindle either manually or by means of a tool exchanger.

Console 10 is movably guided in the vertical coordinate axis at the front wall of the movable column in vertical guides 9. The console, apart from clamping surface 11, carries workpiece seat 12 for bar-shaped workpieces at a location laterally offset from the workspace.

Workpiece seats of the type shown in FIG. 1 are known. They serve for retaining bar-shaped workpieces that are, for the most part, automatically inserted into rearward opening 13. This insertion may be accomplished, for example, by means of a bar loader and suitable clamping means (not shown).

In prior art workpiece seats, at the rearward end of the spindle a fixing means is provided by which the spindle is located in the housing for performing particular drilling and milling operations, for example. This fixing means has an arrangement of clamping discs which are fixed on the spindle so that they radially project and, alternatively, are fixed in a corresponding housing recess, and when needed, can be strongly pressed against each other by a hydraulic piston, for example. However, this known fixing means is structurally complicated and occupies such space that the workpiece seat is elongated. Another technical disadvantage of this fixing means is that the spindle is only fixed at its rear end in the housing. As a result, if workpiece bars of relatively large diameter, for example 100 mm or more, are to be milled or drilled at a relatively high cutting performance, the spindle can elastically twist. This is because of the transmission of forces caused by the processing of the workpiece from the projecting end of the machined workpiece to the clamping chuck into the spindle and then to the fixing means arranged at the end of the spindle into the housing. These contortions of the spindle ultimately lead to positioning errors of the workpiece when it is machined.

SUMMARY OF THE INVENTION

The present invention relates to a machine tool having an elongated housing, a spindle rotatably supported in the housing, and an electric direct drive for the spindle, the rotor of which is fixed on the spindle casing and the stator of which is fixed in the housing. Clamping means are provided at the working-side end of the spindle for fixedly clamping a bar-shaped workpiece. A connection unit provided at the rear part of the housing allows for energy supply and a means for releasably fixing the spindle in the housing.

One object of the invention is to provide a workpiece seat for the machining of bar-shaped workpieces by milling and turning, which provides improved working accuracy. The invention provides improved working accuracy even where relatively thick bar materials are machined and at high cutting forces. The invention also makes possible the reduction of the longitudinal dimensions of the workpiece seat while using a relatively simple structure. The invention achieves this object by employing compact fixing means arranged at the working-side end of the housing.

The compact dimensions of the fixing means makes it possible to position the fixing means at the working-side end of the housing without the need to elongate the workpiece seat. Between the clamping site of the bar-shaped workpiece and the fixing means there is only a short axial distance. This ensures that when milling the projecting end of the bar, torques acting on the spindle are led over a relatively short distance through the activated fixing means into the housing. Torsional phenomena in the spindle, as they occur in the prior art arrangements of the fixing means at the rear end of the spindle, are thereby eliminated.

In addition, a reduction in stresses on the front-side spindle bearings can be achieved by placing the fixing means before the front-side spindle bearing arrangement.

The fixing means has at least one fixing element at least partially surrounding the spindle, which directly acts on the peripheral surface of the spindle. This makes possible the use of simple hollow-cylindrical spindles without the necessity of forming and fastening parts of the fixing means on the spindle body. The fixing element is preferably arranged in a housing and movable or deformable into the direction of the peripheral surface of the spindle upon an appropriate driving force.

According to a structurally simple and cost-efficient further embodiment of the invention, the clamping element has an annular elongated and coaxial pressure chamber formed in a housing part. In this part at least one pressure-oil channel terminates and is limited toward the radially inner side by a deformable wall. If the pressure chamber is supplied with pressurized oil, the inner wall bulges and is firmly pressed against the peripheral surface of the spindle. It is also contemplated herein that the deformable inner wall can also be a constituent of the housing part or can be designed as a resilient sleeve.

BRIEF DESCRIPTION OF THE DRAWING

Further particularities and advantages of the invention will become clear from the following description of preferred embodiments with reference to the drawing, in which.

DETAILED DESCRIPTION OF THE PREFERRED EMBODIMENTS

Figure 1:
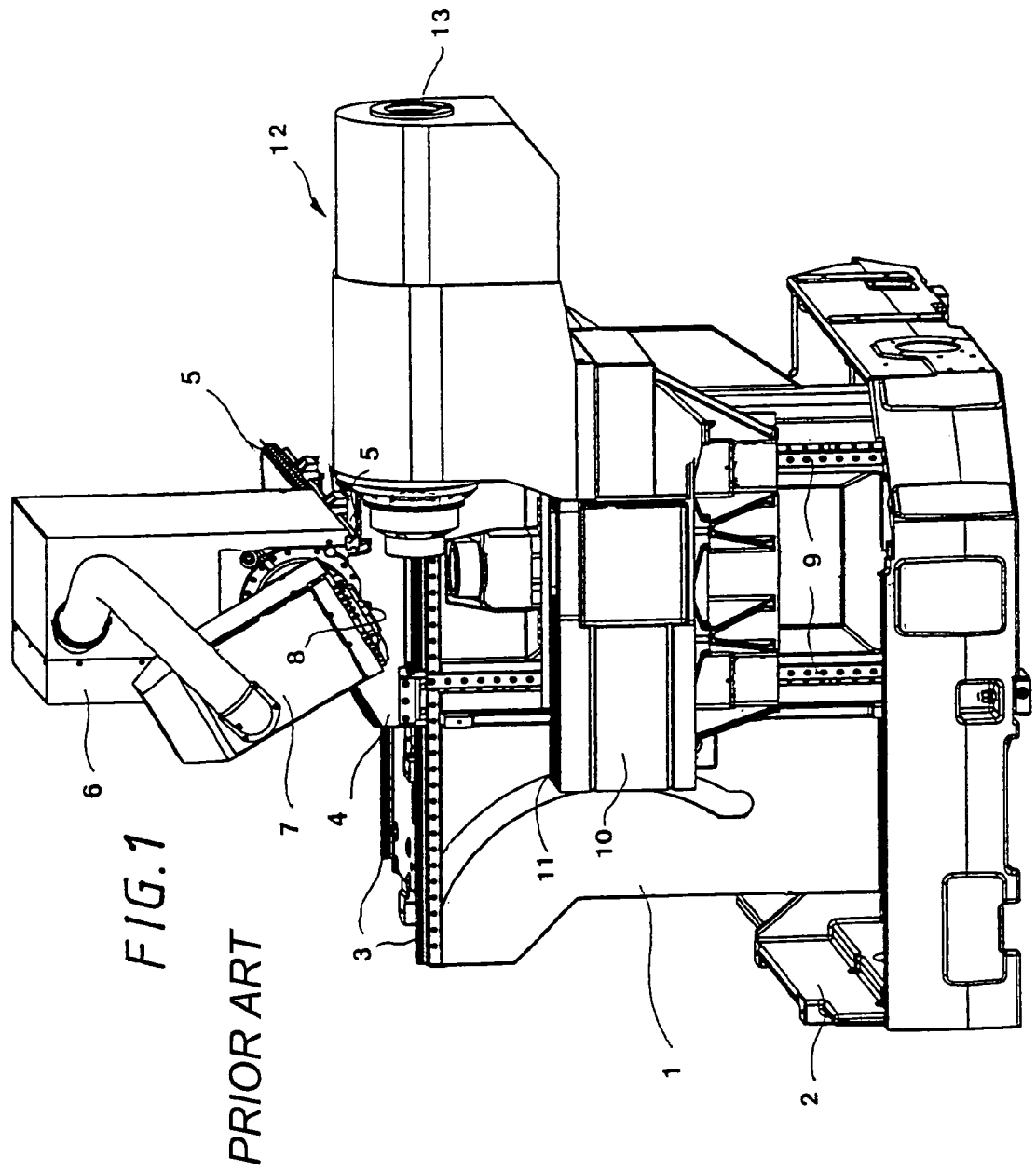
FIG. 1 shows a machine tool according to the prior art having a workpiece seat for workpiece bars.
Figure 2:
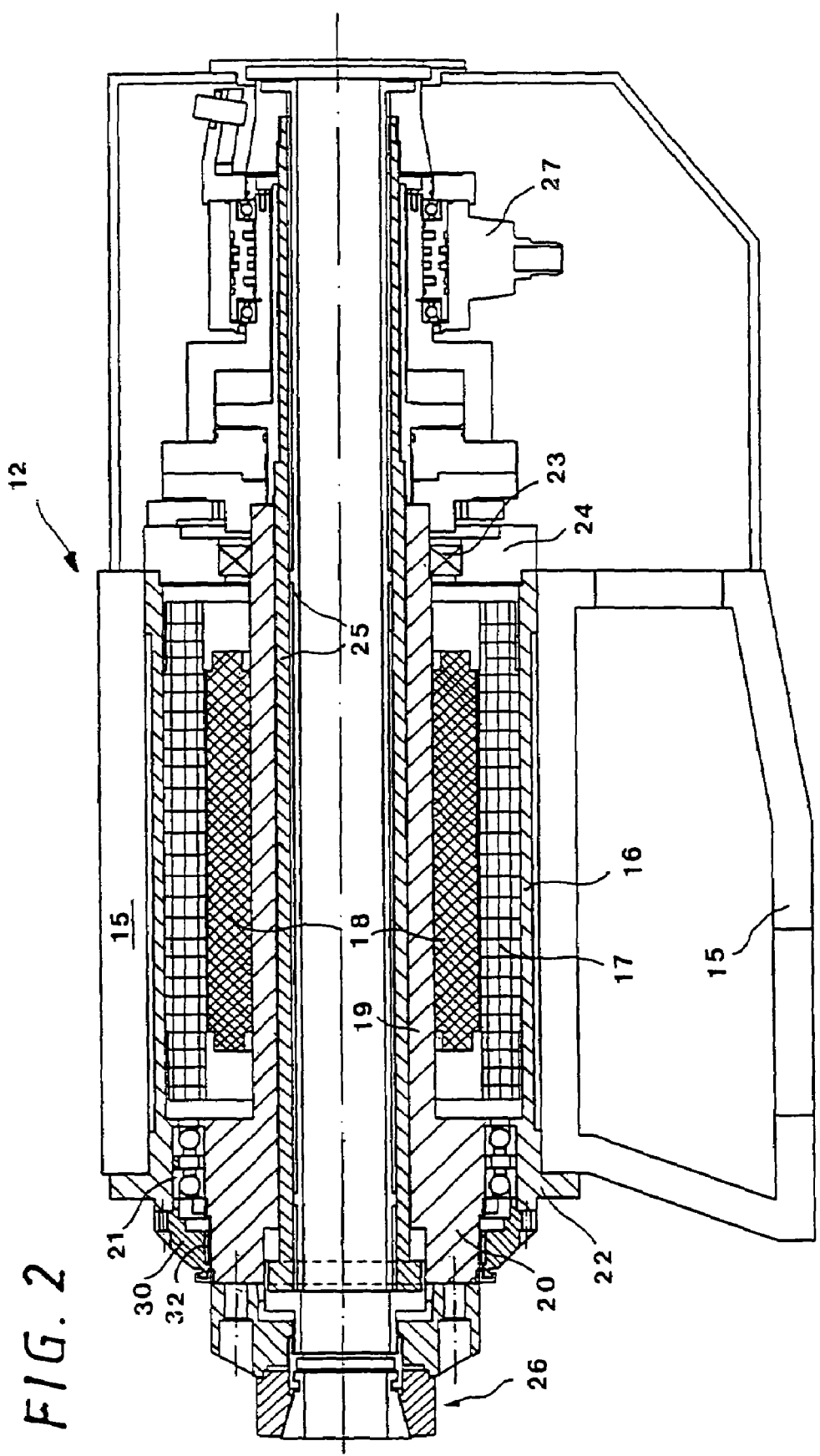
FIG. 2 shows an axial cross-section of a workpiece seat with a fixing means according to the invention.

The basic structure of a workpiece seat according to the invention is shown in axial cross-section in FIG. 2. An electric direct drive is arranged coaxially in hollow-cylindrical elongated housing 16. The housing is surrounded by dimensionally stable and load-bearing cover element 15. Drive stator 17 is fixed at the inner wall of the housing and rotor 18 is fixed on the peripheral wall of elongated hollow-cylindrical spindle 19. Radially enlarged front part 20 of the spindle is supported in front-side ball bearings 21 in front end part 22 of the housing. The rear end part of the spindle is supported via bearing 23 in housing part 24. In the continuous cylindrical interior space of the spindle, sleeve arrangement 25 is located, which forms part of a clamping means for a bar-shaped workpiece inserted into the interior space. Clamping chuck 26, shown on the left side of FIG. 2, is associated to this clamping means. Clamping wedges fixedly clamp or release the front end of the workpiece by way of axial movements. On the right side of FIG. 2, connection unit 27 is shown, by which the driving current for the direct drive, as well as pressurized oil for the hydraulic activation of the clamping chuck, are supplied.

Figure 3:
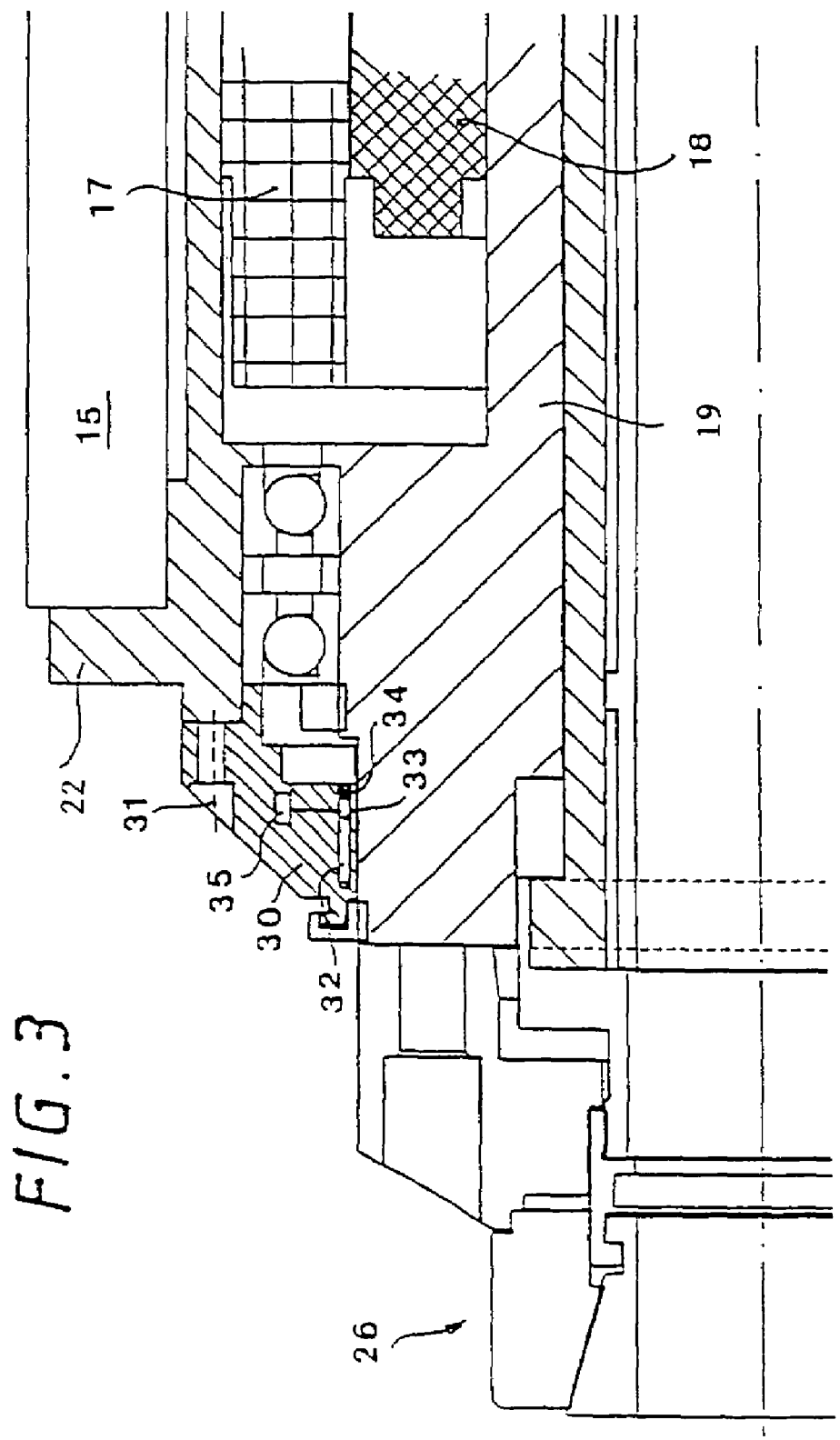
FIG. 3 is an enlargement of a portion of the working end of the machine tool of FIG. 2.

As can be seen in FIG. 3, at front end 22 of housing 16, end ring 30 is fixed by screws 31. This end ring, which forms part of housing 16, has elongated narrow annular pressure chamber 32 coaxial with the axis of the spindle and has a thin, and thus, elastically deformable wall 33 in the radially inward direction. This pressure chamber is sealed at its end side by seal ring 34 and is connected via channel 35 to a pressurized oil supply. By supplying pressure to chamber 32 thin wall 33 elastically bulges in a radially inward direction. As a result, the thin wall firmly contacts the outer peripheral surface of spindle 19. This serves to firmly and exactly fix the spindle in the housing.

The invention is not limited to the represented exemplary embodiments. It is also contemplated that pressure chamber 32, instead of wall 33 designed as a part of end ring 30, can have a resilient sleeve elastically deformable being mounted in the pressure chamber so that it is fluid-tight. Furthermore, the pressure chamber may also be arranged, instead of coaxially to the spindle axis, obliquely or radially between a housing part and a corresponding surface of the spindle.

While the present invention has been illustrated and described by means of specific embodiments, it is to be understood that numerous changes and modifications can be made therein without departing from the spirit and scope of the invention. Accordingly, the invention is limited only by the claims.

What is claimed is:

1. A workpiece seat for the machining of bar-shaped workpieces by milling and turning operations, said workpiece seat comprising: an elongated housing; a spindle rotatably supported in the housing, said spindle having a working end; an electric direct drive for the spindle, said drive comprising a rotor fixed on the spindle and a stator fixed in the housing; a clamping means provided at the working end of the spindle, said clamping means being shaped and configured for fixing a bar-shaped workpiece in the spindle; a front-side spindle bearing arrangement; a connection unit provided at a rear part of the housing for energy supply; and a fixing means for fixing the spindle in the housing by contacting the working end of the spindle, said fixing means being formed as a compact part and arranged on the working end of the spindle before the front-side spindle bearing arrangement, the fixing means further comprising an annular elongated pressure chamber formed in the housing part, into which at least one pressure-oil channel terminates and which is limited in a radial inward direction by a deformable radial inner wall.

2. The workpiece seat according to claim 1, wherein the fixing means comprises at least one fixing element at least partially surrounding the spindle, which directly acts on the peripheral surface of the spindle.

3. The workpiece seat according to claim 2, wherein the fixing element is arranged in a housing part such that it can be moved or deformed by a driving force.

4. The workpiece seat according to claim 2, wherein the fixing means further comprises an annular elongated pressure chamber formed in the housing part, into which at least one pressure-oil channel terminates and which is limited in a radial inward direction by a deformable radial inner wall.

5. The workpiece seat according to claim 3, wherein the fixing means further comprises an annular elongated pressure chamber formed in the housing part, into which at least one pressure-oil channel terminates and which is limited in a radial inward direction by a deformable radial inner wall.

6. The workpiece seat according to claim 1, wherein the radial inner wall of the pressure chamber is a constituent of the housing part.

7. The workpiece seat according to claim 1, wherein the radial inner wall of the pressure chamber is a resilient sleeve.

* * * * *